US008002884B2

(12) United States Patent
Grant et al.

(10) Patent No.: US 8,002,884 B2
(45) Date of Patent: Aug. 23, 2011

(54) INK-JET PRINTING PROCESS AND INK

(75) Inventors: Alexander Grant, Bath (GB); Stephen Paul Wilson, Shepton Mallet (GB); Hugh Alexander Allen, Wells (GB); Nigel Anthony Caiger, Wookey Hole (GB); Derek Edward Wilson, Wells (GB)

(73) Assignee: Sun Chemical Corporation, Parsippany, NJ (US)

( * ) Notice: Subject to any disclaimer, the term of this patent is extended or adjusted under 35 U.S.C. 154(b) by 890 days.

(21) Appl. No.: 11/572,074

(22) PCT Filed: Jun. 30, 2005

(86) PCT No.: PCT/GB2005/002589

§ 371 (c)(1),
(2), (4) Date: Jun. 20, 2007

(87) PCT Pub. No.: WO2006/008441

PCT Pub. Date: Jan. 26, 2006

(65) Prior Publication Data

US 2007/0247502 A1 Oct. 25, 2007

(30) Foreign Application Priority Data

Jul. 23, 2004 (GB) .................................. 0416571.8

(51) Int. Cl.
*C09D 1/00* (2006.01)
*C09D 11/00* (2006.01)
*B41J 2/17* (2006.01)
*G01D 11/00* (2006.01)

(52) U.S. Cl. .................... 106/31.13; 106/31.01; 347/84; 347/95; 347/100

(58) Field of Classification Search ................ 347/6, 51, 347/84, 88, 95, 99, 100
See application file for complete search history.

(56) References Cited

U.S. PATENT DOCUMENTS

| | | | | |
|---|---|---|---|---|
| 6,173,647 | B1 * | 1/2001 | Kakuta et al. | 101/466 |
| 6,593,390 | B1 | 7/2003 | Johnson et al. | |
| 2004/0223033 | A1 * | 11/2004 | Sasaki et al. | 347/45 |
| 2005/0012778 | A1 * | 1/2005 | Nishino et al. | 347/29 |

FOREIGN PATENT DOCUMENTS

WO 2004/031308 A 4/2004

* cited by examiner

*Primary Examiner* — Matthew Luu
*Assistant Examiner* — Kendrick X Liu
(74) *Attorney, Agent, or Firm* — McKenna Long & Aldridge, LLP.

(57) ABSTRACT

The invention relates to a process of ink jet printing a radiation-curable ink from a printer having a de-wetting faceplate onto a substrate in which the ink is such that it has an advancing contact angle on the substrate of no more than 22° and a receding contact angle on the faceplate, after a period of contact of one month, of greater than 28°. The invention also provides a radiation-curable ink for use in an ink jet printer having a de-wetting faceplate, the ink having a receding contact angle on a material having a surface energy in the range of 16 to 20 dyne/cm of greater than 28° after a period of contact of one month and having an advancing contact angle on a substrate having a surface energy of less than 30 dyne/cm of no more than 22°.

14 Claims, No Drawings

INK-JET PRINTING PROCESS AND INK

CROSS REFERENCE TO RELATED APPLICATIONS

This application is the U.S. national stage filing of the corresponding international application number PCT/GB2005/002589 filed on Jun. 30, 2005, which claims priority to and benefit of a Great Britain application number 0416571.8, filed Jul. 23, 2004, each of which is hereby incorporated herein by reference.

The invention relates to an ink jet printing process, in particular, to a process of printing from an ink-jet printer having a de-wetting faceplate, and to inks for use in the process.

As ink-jet technology continues to evolve and gain market share from traditional printing methods in segments such as display graphics, packaging and textile, demands are placed on both ink and print-head to produce high speed printing that is sufficiently reliable and offers print quality and resistance properties comparable to those achieved using conventional printing processes. UV curable jet-inks have recently come to the fore as an ink technology class because they are able to provide good resistance properties and offer formulation and application flexibility due to the wide range of raw materials available.

A problem often encountered with ink-jet printing is the formation of pools of ink on a print-head faceplate as the ink jets over time. As a consequence of this, subsequent ink droplets may be mis-directed, causing print quality defects which worsen as the speed of printing is increased, giving unreliable printing characteristics. Furthermore, maintenance of the print-head by wiping or replacement may become necessary prior to further printing.

As new print head technology develops, the nature of the print-head faceplate material has become increasingly important. In particular, the usage of comparatively low surface energy faceplates (known as de-wetting faceplates) has emerged as one means of reducing ink pooling and misdirected jets. Reliable jetting from de-wetting faceplates has in one case been achieved using oil-based inks (WO 96/12772). However, there remains a need for non solvent-based jet inks which print reliably from de-wetting faceplates and which also spread on the substrate sufficiently to give good print quality.

The invention provides a process of printing a radiation-curable ink from a printer having a de-wetting faceplate onto a substrate in which the ink is such that it has an advancing contact angle on the substrate of no more than 22° and a receding contact angle on the faceplate, after a period of contact of one month, of greater than 28°.

Typically, the ink will be introduced into the printer, jetted from the de-wetting faceplate onto the substrate and then cured with radiation. The radiation may be, for example, electron beam but is preferably UV light.

The inventors have discovered that the advancing contact angle of the ink on the substrate and the receding contact angle of the ink on the faceplate are properties of critical importance in determining the reliability and quality of ink-jet printing from a printer having a de-wetting faceplate. The inventors have furthermore discovered that the receding contact angle of the ink on the faceplate is liable to decrease on prolonged contact between the ink and the faceplate with the degree of decrease being dependent upon the composition of the ink, and that it is the receding contact angle after a period of time, for example, one month, which is of importance in determining the reliability of the jetting. Thus, an ink which has an initial receding contact angle on the faceplate of more than 28° but which falls to below 28° on prolonged contact with the faceplate will tend to print poorly whereas an ink which either does not show a decrease of receding contact angle over time or which shows a decrease only to an angle greater than 28° will tend to print well.

Inks having an advancing contact angle on the substrate of more than 22° tend not to spread on the substrate and remain as a series of discrete dots, thereby giving an image of poor optical density.

The inventors have found that inks for use in the process of the invention can, in general, be obtained by careful formulation of the monomer mix to obtain a base ink having a receding contact angle of greater than 28° on the faceplate after prolonged contact and then modifying that base ink, if necessary, to obtain an advancing contact angle on the substrate of no more than 22°, for example, by adding a surfactant.

The advancing contact angle on the substrate can be measured by jetting droplets of ink onto the substrate, for example, using a Fibro Dat 1100 apparatus from Fibro System AS (Stockholm, Sweden), and measuring the advancing contact angle as the droplet spreads. In a favoured method, the drop volume is 3.9 μl, the drops are applied with 0.2 mm diameter tubing and the advancing contact angle is measured 2.0 seconds after the drop has impacted on the substrate.

The receding and advancing contact angles of the ink on the faceplate can be calculated by the Wilhelmy method, using a tensiometer, for example, a Camtel Ltd tensiometer to measure the force on the faceplate when dipping it into and removing it from the ink. Prolonged contact of the ink and faceplate is achieved simply by immersing the faceplate in the ink for the required period of time.

All reference herein to contact angles are to those angles as measured at 25° C.

The de-wetting surface of the faceplate is typically of polyimide coated with a fluorinated material.

The surface energy, also known as critical surface tension, may also be measured using the method of Zisman, described at page 351 onwards of "Physical Chemistry of Surfaces" by A W Adamson, 3$^{rd}$ Edition, John Wiley & Sons, 1976, in which the cosine of the contact angle on the surface is measured for each of a range of liquids. Plotting the cosine of the contact angle against the surface tension of the liquid and extrapolating to where the cosine of the contact angle=1 gives the critical surface tension of the surface. n-Hexane, n-octane, 1-octanol and ethane-1,2-diol are suitable liquids for use in the Zisman method. Preferably, the de-wetting faceplate will have a surface energy of not more than 20 dyne/cm when measured using the Zisman method. Preferably, the face plate has a surface energy in the range of from 16 to 20 dyne/cm when measured by the Zisman method.

The substrate may be any material on which it is desired to print an image. For example, the substrate may be paper, card, glass, metal, polycarbonate, polyvinylchloride (PVC), polyacrylate or polymethacrylate or polyester. The process of the invention is especially suitable for printing on substrates which are traditionally regarded as being difficult to print onto with ink-jet because of their low surface energy, for example, glass, metal, polycarbonate, polyvinylchloride, polyacrylate and polymethacrylate and polyester. In one embodiment, the substrate has a surface energy of less than 30 dyne/cm.

Advantageously, the ink is such that it has an advancing contact angle on the substrate of no more than 20°, preferably no more than 15°.

In most cases the advancing contact angle of the ink on the substrate will be above 10. Preferably, the ink is such that it has a receding contact angle on the faceplate, after a period of contact of one month, of greater than 30°, more preferably greater than 35°.

The ink may comprise a surfactant. The surfactant may be included, for example, in order to reduce the advancing contact angle of the ink on the substrate. Surfactants are known for use in ink-jet inks to reduce the contact angle on the substrate, that is, to improve the wetting of the substrate by the ink. However, surfactants have not found acceptance in ink-jet inks for use with printers having de-wetting faceplates because there exists a belief that inclusion of a surfactant in the ink would promote wetting of the print head faceplate and lead to the problem of ink pooling mentioned above. In accordance with the invention, however, it has been found that it is possible to include some surfactant in the ink without lowering the receding contact angle on the faceplate to an unacceptable level.

A wide range of surfactants is commercially available. Surfactant compounds, in general, comprise a hydrophobic part and a hydrophilic part and can be broadly categorised according to the chemical nature of the hydrophobic part, (for example, hydrocarbon, silicone or fluorocarbon) or by the nature of the hydrophilic part, (for example, anionic, cationic or non-ionic). Silicone surfactants are preferred. Fluorinated surfactants have in some instances been found to damage the face plate and are therefore less preferred. A suitable surfactant for use in any particular ink according to the invention may be identified by trial and experiment. The inventors have found that some surfactants which are known for use in ink-jet inks are not suitable for use in the inks of the invention because they cause the ink to wet the de-wetting faceplate (that is, the receding contact angle is 0°). For example, some fluorinated surfactants have been found to lead to wetting of the faceplate. In contrast, some silicone surfactants have been found to be suitable, especially polyether polysiloxane surfactants such as those supplied by BYK Chemical and Tego Chemie.

The surfactant, when present, may be present in an amount of up to 1% and is preferably present in an amount of from 0.2 to 0.5% by weight of the ink. Where a surfactant is used, it will in general be present in an amount of at least 0.01% based on the weight of the ink.

Surfactants having a low dynamic surface tension are believed to be especially suitable for use in the inks of the invention which also desirably have a low dynamic surface tension. For example, the ink preferably has a dynamic surface tension of less than 35 dyne/cm when measured at a surface age of 10 milliseconds. Silicone surfactants are known to have generally low dynamic surface tensions whereas fluorinated surfactants are known to have, in general, higher dynamic surface tensions.

As mentioned above, one method of formulating an ink according to the invention is to identify a base monomer mixture which has a receding contact angle on prolonged exposure to the faceplate in the desired range, and then to add a suitable surfactant, if necessary, in order to achieve the desired advancing contact angle on the substrate. It has been found that inclusion of monomers such as alkyl acrylates, especially tridecylacrylate, having a low surface energy is likely to cause a reduction in the receding contact angle on the faceplate after prolonged exposure. Accordingly, it is preferred that the ink comprises less than 10% by weight of any monomer or monomers which have a surface energy of 30 dynes/cm or less.

The ink must be of a viscosity which is sufficiently low that it can be jetted properly. Advantageously, the ink has a viscosity at 25° C. or less than 60 cPs, more preferably less than 40 cPs and especially preferably less than 20 cPs.

In a further aspect, the invention provides an ink for use in an ink-jet printer having a de-wetting faceplate, the ink having a receding contact angle on a material having a surface energy in the range of from 16 to 20 dyne/cm, when measured using the Zisman method, of greater than 28° after a period of contact of one month, and having an advancing contact angle on a substrate having a surface energy of less than 30 dyne/cm of no more than 22°.

In a particularly preferred embodiment the ink is substantially free of water or volatile organic solvents ("volatile" meaning subject to evaporation from the ink or cured film under the conditions of printing) in the sense that no such components are deliberately included in the ink but small amounts may be present as impurities. Advantageously, the ink comprises less than 5%, more advantageously less than 2% and especially advantageously less than 1% by weight of water or volatile organic solvents.

Examples of inks according to the invention are described below for the purpose of illustration only.

EXPERIMENTAL

Contact Angles

The contact angles of the ink on the print head faceplate were determined according to the Wilhelmy method in which the faceplate is dipped into the ink and the force on the faceplate (corrected for buoyancy) is measured and used to calculate the advancing contact angle (as the faceplate is dipped into the ink) and the receding contact angle (as the faceplate is withdrawn from the ink). A tensionmeter made by Camtel Ltd (Royston, Herts, UK) was used. Measurements were made as the ink initially contacted the faceplate and also after the faceplate had been soaked in the ink over a range of time periods.

The advancing contact angle of the ink on the substrate was measured by jetting large (3.9 μl) droplets of the ink onto the substrate from 0.2 mm diameter tubing and measuring the advancing contact angle 2.0 seconds after impact of the drop on the substrate using a Fibro Dat 1100 apparatus (Fibro System AB—Stockholm, Sweden).

Jetting Reliability

Jetting reliability was assessed by printing UV jet-inks from a Toshiba Technologies (TTEC) CA3/Xaar Leopard print-head containing a de-wetting face-plate with a surface energy of 18.0±2.0 dyn/cm. Printing was undertaken at 19-22V at 45-50° C. at an ink reservoir height of 50 mm below the faceplate. The number of nozzles lost over a 60 minute period at high duty cycle was noted. Loss of none or only a few nozzles over that period was regarded as showing good printing reliability.

Surface Energy of TTEC Faceplate

The surface energy of a Toshiba Technologies (TTEC) dewetting faceplate from a CA3/Xaar Leopard print-head was measured according to the Zisman method as follows. Two faceplates were adhered back-to-back with superglue and placed in a Camtel tensiometer. The immersion speed was 0.1 mm/second and the immersion depth was 6 mm. n-hexane, n-tetradecane and water were used as test fluids. The equations used were the Girifalco-Goods-Fowkes-Young (GGFY) equation, which is suitable for test fluids having a low contact angle on the substrate, and the GGFY equation modified to take into account the Young-Dupre equation, which is suitable for use with test fluids having a high contact angle on the substrate.

The results are shown in table 1.

TABLE 1

| Surface tension, contact angles and surface energies for test liquids on TTEC face-plate. | | | | | | | |
|---|---|---|---|---|---|---|---|
| | Fluid | | | | | | |
| | Surface tension (dyn/cm) | | | Contact Angle (°) | | Surface Energy (dyn/cm) | |
| | Total | Polar | Dispersive | Adv | Rec | GGFY | Mod GGFY |
| n-hexane | 18.4 | 0 | 18.4 | 8.41 | wet | 18.2 | 18.27 |
| n-tetradecane | 25.6 | 0 | 25.6 | 49.99 | 41.61 | 17.27 | 19.96 |
| water | 72.8 | 51 | 21.8 | 110.5 | 101.68 | 7.68 | 19.23 |

It can be seen from table 1 that good agreement on a surface energy value of 18±2 dyne/cm is achieved between the surface energy values obtained using the GGFY equation for n-hexane and n-tetradecane and the surface energy value obtained using the modified GGFY equation for water.

Print quality was assessed visually.

Inks—Materials Used pNPGPA is propoxylated neopentyl glycol diacrylate and is available from Sartomer as Sartomer 9003.

Irgacure 369 is a photoinitiator available from Ciba.

Sartomer 506 is isobornyl acrylate and is available from Sartomer.

DVE 3 is divinylether and is available from Rahn and BASF.

TDA is tridecylacrylate.

Lucerin TPO is a phosphine oxide based initiator supplied by BASF.

Genorad 16 is an inhibitor and is available from Rahn.

Ertomer 256 is a penta acrylate monomer and is available from Polymer Technologies.

Solsperse 5000 is a synergist available from Avecia.

EFKA 7476 is a dispersant from Stork Chemicals.

Tegoglide A115, Tegoglide ZG400, Trad 2300 and Tegowet 270 are all silicone surfactants.

Zonyl FSP is an anionic fluorinated surfactant. Zonyl FSK is an amphoteric fluorinated surfactant. Zonyl FSD is a cationic fluorinated surfactant. All are available from Tego Chemie which is part of the Goldschmidt group.

Invercote G is a clay coated board.

Simcaster is calendered paper.

Paper Alu OPE is a laminate having a polyester printing surface.

Ink Compositions

Inks were made to the compositions shown in table 2 with the surfactants being added last. Viscosity and surface tension data is also given in table 1.

Contact angle data for the inks on the faceplate and on several substrate materials is given in table 3.

TABLE 2

| Ink Composition | | | | | | |
|---|---|---|---|---|---|---|
| | Code | | | | | |
| | ULO1-50-2 | ULO1-48-1 | IIB2-68-2 | IIB2-117-1 | IIB2-117-2 | IIB2-46-2 |
| pNPGDA | 65.26 | 67.45 | 71.06 | 72.46 | 72.46 | 73.30 |
| Irgacure 369 | 1.8 | 1.80 | 1.40 | 1.40 | 1.4 | 1.00 |
| Lucerin TPO | | | | | | |
| Isobomyl acrylate | 6 | 6.00 | 0.00 | 0.00 | 0 | 0.00 |
| DVE3 | 11.6 | 10.60 | 6.50 | 11.60 | 11.6 | 11.60 |
| TDA | 0 | 0.00 | 6.50 | 0.00 | 0 | 0.00 |
| GENORAD 16 | 0.3 | 0.27 | 0.36 | 0.36 | 0.36 | 0.28 |
| Ertmer 256 | 10 | 10 | 10.00 | 10.00 | 10 | 10.00 |
| Solsperse 5000 | 0.01 | 0.26 | | | | 0.01 |
| Pigment red 170 | 0.69 | | | | | 0.69 |
| Pigment violet 19 | 1.47 | | | | | 0.95 |
| EFKA 7476 | 2.87 | 1.83 | 1.89 | 1.89 | 1.89 | 2.20 |
| Pigment red 57:1 | | | 2.30 | 2.30 | 2.30 | |
| Pigment blue 15:3 | | 1.79 | | | | |
| Tegoglide A115 | | 0.2P.A | 0.5P.A | 1.0P.A | 0 | 0 |
| Tegoglide ZG400 | | | | | 0.5P.A | 0 |
| Tegowet 270 | | | | | | 0.5P.A |
| BYK333 | | | | | | |
| Zonyl FSP | | | | | | |
| Zonyl FSK | | | | | | |
| Zonyl FSD | | | | | | |
| Visc | 9.5 (50C) | 8.8 (50C) | 11.5 (45C) | 9.57 (50C) | 9.67 (50C) | 9.33 (50C) |
| Surf. Tens | 33 | 34 | 35 | 28 | 27.5 | |
| | IIB2-152-5 | IIB2-152-6 | IIB2-117-3 | IIB1-54-1 | IIB1-54-1 | IIB1-54-3 |
| pNPGDA | 76.49 | 76.49 | 72.46 | 90.96 | 90.96 | 90.96 |
| Irgacure 369 | 1.40 | 1.40 | 1.4 | | | |
| Lucerin TPO | | | | 4.00 | 4.00 | 4.00 |
| Isobomyl acrylate | 0.00 | 0.00 | 0 | | | |

TABLE 2-continued

| | | | | | | |
|---|---|---|---|---|---|---|
| DVE3 | 8.00 | 8.00 | 11.6 | | | |
| TDA | 0.00 | 0.00 | 0 | | | |
| GENORAD 16 | 0.34 | 0.34 | 0.36 | 0.09 | 0.09 | 0.09 |
| Ertmer 256 | 10.00 | 10.00 | 10 | | | |
| Solsperse 5000 | | | | 0.33 | 0.33 | 0.33 |
| Pigment red 170 | | | | | | |
| Pigment violet 19 | | | | | | |
| EFKA 7476 | 1.70 | 1.70 | 1.89 | 2.34 | 2.34 | 2.34 |
| Pigment red 57:1 | 2.07 | 2.07 | 2.30 | | | |
| Pigment blue 15:3 | | | | 2.28 | 2.28 | 2.28 |
| Tegoglide A115 | 0 | | | | | |
| Tegoglide ZG400 | 0 | | | | | |
| Tegowet 270 | 0 | | | | | |
| BYK333 | 1.0 P.A | | | | | |
| Zonyl FSP | | 1.0 P.A | | | | |
| Zonyl FSK | | | 1.0 P.A | | | |
| Zonyl FSD | | | | 1.0 P.A | | |
| Visc | 10.5 (48C) | 10.6 (48C) | 9.62 (50C) | 10-12 (50C) | 10-12 (50C) | |
| Surf. Tens | 29 | 33 | | 30.5 | 28 | 34 |

PA - Component was post added to the monomer mixture

TABLE 3

| Contact Angle Results | | | | | | | | | | | | |
|---|---|---|---|---|---|---|---|---|---|---|---|---|
| | Code | | | | | | | | | | | |
| | Ink 1:0.2% A115 IIB2-117-1 | | Ink 2:0.5% A115 IIB2-117-2 | | Ink 3:0.5% ZG400 IIB2-152-5 | | Ink 4:0.5% Wet270 IIB2-152-6 | | Ink 5:1% BYK333 IIB2-117-3 | | | |
| On Face-Plate | | | | | | | | | | | | |
| Contact Angle | Advancing | Receding | Advancing | Receding | Advancing | Receding | Advancing | Receding | Advancing | | Receding | |
| Initial | 51.38 | 37.29 | 52.73 | 43.53 | 54.39 | 42.31 | 60.03 | 53.38 | 43.58 | | 21.27 | |
| 3 day | 49.43 | 35.71 | 53.62 | 42.2 | 55.73 | 44.47 | 59.22 | 50.22 | 49.06 | | 26.12 | |
| 5 day | 51.92 | 36.53 | 50.36 | 33.19 | | | | | 46.55 | | 17.09 | |
| 12 day | 51.97 | 37.11 | 53.62 | 42.2 | | | | | | | | |
| 17 day | 48.78 | 31.54 | 52.33 | 37.51 | | | | | | | | |
| 1 month | 48.59 | 32.76 | 51.94 | 35.69 | 54.1 | 42.18 | 60.47 | 48.49 | | | | |
| On Substrate | | | | | | | | | | | | |
| Paper alu OPE | 17.1 | | 16.8 | | 25.1 | | 20.5 | | | | | |
| Inver-cote G | <17.8 | | 12.6 | | 17.8 | | 22.3 | | | | | |
| Sim-caster | 17.2 | | 21.3 | | 26.2 | | 15.6 | | | | | |
| Ink caster | ULO1-50-2 | | ULO1-48-1 | | 11B2-68-2 | | 0.2% A115 11B2-117-1 | | 0.5% A115 11B2-117-2 | | 1% A115 11B2-46-2 | |
| On Face-Plate | | | | | | | | | | | | |
| Contact Angle | Advancing | Receding | Advancing | Receding | Advancing | Receding | Advancing | Receding | Advancing | Receding | Advancing | Receding |
| Initial | 62.38 | 54.54 | 58.39 | 53.04 | 58.85 | 52.91 | 51.38 | 37.29 | 52.73 | 43.53 | 54.27 | 41.25 |
| 3 day | 62.99 | 52.95 | 62.48 | 51.31 | 61.71 | 42.62 | 49.43 | 35.71 | 53.62 | 42.2 | 51.76 | 38.56 |
| 5 day | | | | | | | 51.92 | 36.53 | 50.36 | 33.19 | | |
| 12 day | | | | | 58.82 | 17.51 | 51.97 | 37.11 | 53.62 | 42.2 | | |
| 17 day | | | | | | | 48.78 | 31.54 | 52.33 | 37.51 | | |
| 1 month | | | | | 57.72 | wetted | 48.59 | 32.76 | 51.94 | 35.69 | | |
| On Substrate | | | | | | | | | | | | |
| Inver-cote G | 25.8 | | 14.2 | | 12.9 | | <17.8 | | 12.6 | | | |
| Print quality | poor | | excellent | | excellent | | | | | | | |
| Paper alu OPE | | | | | | | 17.1 | | 16.8 | | | |
| Sim-caster | | | | | | | 17.2 | | 21.3 | | | |

TABLE 3-continued

| Contact Angle Results | | | | | | |
|---|---|---|---|---|---|---|
| | Code | | | | | |
| | Ink 1:0.2% A115 IIB2-117-1 | Ink 2:0.5% A115 IIB2-117-2 | Ink 3:0.5% ZG400 IIB2-152-5 | Ink 4:0.5% Wet270 IIB2-152-6 | Ink 5:1% BYK333 IIB2-117-3 | |
| Jetting Reliability: 100% duty cycle 60 mins | | | | | | |
| Nozzles lost (average of several runs) | 0 | 11.5 | 2 | 2 | 2 | 11 |

Comparison 1—Monomer Balance

Two inks having similar surface tension values were investigated and found to provide similar advancing and receding contact angles on a de-wetting faceplate. However, the ink (UL01-50-2) having an advancing contact angle on the substrate (Invercote G) of 25.8° gave poor quality whereas the other ink (IIB-68-2), which was formulated to include tridecylacrylate to improve wetting of the substrate, had an advancing contact angle on the same substrate of 12.9° and gave excellent print quality. However, after soaking for 1 month ink IIB-68-2 wetted the faceplate due to the presence of the tridecylacrylate.

Results are given in table 4.

TABLE 4

| Contact angle results for inks differing in monomer balance. | | | | |
|---|---|---|---|---|
| | Surface Tension (dyn/cm) | | | |
| | ULO1-50-2 33.0 | | IIB2-68-2 35.0 | |
| | Face-Plate Wetting | | | |
| Contact Angle (°) | Advancing | Receding | Advancing | Receding |
| Initial | 62.38 | 54.54 | 58.85 | 52.91 |
| 3 day soak | 62.99 | 52.95 | 61.71 | 42.62 |
| | Substrate Wetting: Invercote G | | | |
| Adv. Contact (°) | 25.8 | | 12.9 | |
| Print quality | poor | | excellent | |
| | Jetting Reliability | | | |
| Nozzles lost | 0 | | 2 | |

Comparison 2—Surfactant Concentration

Contact angle and print test results for a surfactant-free ink (UL-150-2) having a high advancing contact angle on the substrate are compared in table 5 with results for inks (IIB2-117-1 and IIB-117-2) which contain Tegoglide A115 surfactant at levels of 0.2% and 0.5%, respectively, and have lower advancing contact angles on the substrate. Despite having somewhat lower surface tension than surfactant-free ink and lower receding contact angles, the inks comprising the surfactant show good stability over long term faceplate soaks, give good jetting reliability and show improved print quality.

TABLE 5

| Contact angle results for inks comprising a range of surfactants. | | | | | | |
|---|---|---|---|---|---|---|
| | Surface Tension (dyn/cm) | | | | | |
| | ULO1-50-2 33.0 | | 11B2-117-1 0.2% A115 28.0 | | 11B2-117-2 0.5%A11S 27.5 | |
| | Face-Plate Wetting | | | | | |
| Contact Angle (°) | Advancing | Receding | Advancing | Receding | Advancing | Receding |
| Initial | 62.38 | 54.54 | 51.38 | 37.29 | 52.73 | 43.53 |
| 3 day soak | 62.99 | 52.95 | 49.43 | 35.71 | 53.62 | 42.2 |
| 1 month soak | | | 48.59 | 32.76 | 51.94 | 35.69 |
| | Substrate Wetting: Invercote G | | | | | |
| Adv. Contact (°) | 25.8 | | <17.8 | | 12.6 | |
| Print quality | poor | | excellent | | excellent | |
| | Jetting Reliability | | | | | |
| Nozzles lost | 0 | | 2 | | 2 | |

Comparison 3—A Range of Surfactants

Table 6 shows contact angle results for six inks which each contain different surfactant.

As table 6 shows, the tested fluoro surfactants do not provide any de-wetting properties on a low energy face-plate. That occurs irrespective of whether the surfactants are anionic, cationic or amphoteric in nature. In turn, these inks would not print reliably from low surface energy print-heads. Of the silicone surfactants shown, inks IIB2-152-5 & -6 offer strong de-wetting characteristics on the face-plate over time. From results shown in other examples, these would be expected to jet reliably. Conversely, surfactant TRAD 2300, as used in IIB2-152-4 would not be expected to do so as its receding contact angle diminishes significantly over time when soaked.

TABLE 6

Contact angle results for inks comprising a range of surfactants.

| | Surface Tension Dyn/cm | | | | | | | | | | | |
|---|---|---|---|---|---|---|---|---|---|---|---|---|
| | Silicone surfactants | | | | | | Fluoro surfactants | | | | | |
| | IIB2-152-5 0.5% ZG400 29.0 | | IIB2-152-6 0.5% Wet270 33.0 | | IIB2-152-4 0.5% TRAD 2300 26.0 | | IIB1-54-1 1% Anionic 30.5 | | IIB1-54-3 1% Cationic 34.0 | | IIB1-54-1 1% Amphoteric 28.0 | |
| Face-Plate Wetting | | | | | | | | | | | | |
| Contact Angle (°) | Adv | Rec | Adv | Rec | Adv | Rec | Adv | Rec | Adv | Rec | Adv | Rec |
| Initial | 54.39 | 42.31 | 60.03 | 53.38 | 50.49 | 42.93 | 53.56 | wetted | 65.34 | wetted | 57.3 | wetted |
| 3 day soak | 55.73 | 44.47 | 59.22 | 50.22 | 51.5 | 40.96 | | | | | | |
| 1 month soak | 54.1 | 42.18 | 60.47 | 48.49 | 46.78 | 20.66 | | | | | | |
| Substrate wetting | | | | | | | | | | | | |
| Adv. Contact (°) Invercote G | 17.8 | | 22.3 | | | | | | | | | |

The invention claimed is:

1. A process of ink-jet printing a radiation-curable ink from a printer having a de-wetting faceplate onto a substrate in which the ink comprises an acrylate monomer mix, said acrylate monomer mix comprising two or more alkyl acrylates, and has an advancing contact angle on the substrate of no more than 22° and a receding contact angle on the faceplate, after a period of contact of one month, of greater than 28°.

2. A process as claimed in claim 1 in which the de-wetting faceplate has a surface energy of less than 20 dyne/cm.

3. A process as claimed in claim 1, wherein the substrate has a surface energy of less than 30 dyne/cm.

4. A process as claimed in claim 1, wherein the substrate is selected from the group consisting of paper, aluminium foil, polyolefins, polyester, polyvinyl chloride, polyacrylate or polymethacrylate, and polycarbonate.

5. A process as claimed in claim 1, wherein the ink is such that it has an advancing contact angle on the substrate of no more than 20°.

6. A process as claimed in claim 1, wherein the ink is such that it has a receding contact angle on the faceplate, after a period of contact of one month, of greater than 30°.

7. A process as claimed in claim 1, wherein the ink comprises a surfactant.

8. A process as claimed in claim 7 in which the surfactant is a silicone surfactant.

9. A process as claimed in claim 1, wherein the ink comprises less than 10% by weight of low surface energy monomer(s).

10. A process as claimed in claim 1, wherein the ink has a viscosity of less than 60 mPa s (cPs) at 25° C.

11. A radiation-curable ink for use in an ink-jet printer having a de-wetting faceplate, said ink comprising an acrylate monomer mix, said acrylate monomer mix comprising two or more alkyl acrylates, the ink having a receding contact angle on a material having a surface energy in the range of 16 to 20 dyne/cm of greater than 28° after a period of contact of one month and having an advancing contact angle on a substrate having a surface energy of less than 30 dyne/cm of no more than 22° .

12. An ink as claimed in claim 11 which comprises a surfactant.

13. An ink as claimed in claim 12 in which the surfactant is a silicone surfactant.

14. An ink as claimed in claim 11 which has a viscosity of less than 60 mPa s (cPs) at 25° C.

* * * * *